United States Patent
Tateishi

(10) Patent No.: US 6,396,234 B1
(45) Date of Patent: May 28, 2002

(54) SERVO CONTROL APPARATUS AND SERVO CONTROL METHOD

(75) Inventor: Kiyoshi Tateishi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/503,193

(22) Filed: Feb. 14, 2000

(30) Foreign Application Priority Data

Feb. 17, 1999 (JP) ............................................. 11-039050

(51) Int. Cl.$^7$ ................................................ G11B 7/095
(52) U.S. Cl. ......................................... 318/632; 318/610
(58) Field of Search ................................ 318/600, 609, 318/610, 611, 615, 621, 623, 632

(56) References Cited

U.S. PATENT DOCUMENTS

| | | | | |
|---|---|---|---|---|
| 5,274,314 A | * | 12/1993 | Maqueira | 318/632 |
| 5,493,192 A | * | 2/1996 | Nihei et al. | 318/568.2 |
| 5,710,500 A | * | 1/1998 | Matsuo et al. | 318/799 |
| 5,719,479 A | * | 2/1998 | Kato et al. | 318/563 |
| 5,734,242 A | * | 3/1998 | Iwashita | 318/434 |
| 5,872,439 A | * | 2/1999 | Nomura | 318/632 |
| 5,929,587 A | * | 7/1999 | Kang | 318/623 |
| 5,936,369 A | * | 8/1999 | Iwashita et al. | 318/609 |
| 6,122,998 A | * | 9/2000 | Iwashita | 82/1.11 |

OTHER PUBLICATIONS

B. P. Lathi. "Signal Processing and Linear Systems", Berkeley Cambridge Press, 1998. pp. 500–501, "Low pass Filters".*
Franklin et al. "Feedback control of Dynamic Systems"; Third Edition–Addison–Wesley Publishing Company, 1994, chapter 5.*
Dorf et al. "Modern Control Systems", Eighth Edition. Addison–Wesley, 1998. Chapter 10.*
Sedra/Smith. "Microelectronic Circuits", Fourth Edition, Oxford University Press, 1998, pp. 74 and 76.*

* cited by examiner

*Primary Examiner*—Bentsu Ro
(74) *Attorney, Agent, or Firm*—Nixon & Vanderhye

(57) ABSTRACT

A servo control apparatus for performing a feedback control to a controlled system having characteristics represented by a characteristic equation including at least a second order term, a first order term and a zero order term, includes a disturbance estimating device that has an internal model having characteristics represented by a characteristic equation including only a second order term, and that estimates a disturbance applied to the controlled system by using the internal model, thereby generating an estimated disturbance value; and a compensating device that compensates the disturbance on the basis of the estimated disturbance value.

22 Claims, 12 Drawing Sheets

SERVO CONTROL APPARATUS AND SERVO CONTROL METHOD

BACKGROUND OF THE INVENTION

1. Field of the Invention

The present invention relates to a servo control apparatus for controlling a subject to be controlled (i.e., controlled system) defined by a characteristics equation including at least a second order term, a first order term and a zero order term by the feedback control, more specifically, it relates to a servo control apparatus for estimating the disturbance to be applied on the controlled system and compensating an actual disturbance on the basis of the estimated disturbance.

2. Description of the Related Art

Recently, studies have been conducted actively on the technique for preliminarily estimating the disturbance to be applied on the controlled system in the feedback control of a controlled system, and compensating an actual disturbance by applying the manipulated variable considering the estimated disturbance to the controlled system.

As a preferable device for predicting the disturbance, a so-called state observer is attracting the attention recently.

The observer will be explained.

The observer is a device for estimating the state that cannot be detected actually from the detectable state. The state that cannot be detected actually is, for example, the state of a controlled system with a disturbance applied. The disturbance predicted to be applied on the controlled system is estimated by the observer so that the manipulated variable to be corrected is calculated based on the estimated disturbance variable, and the result thereof is added to the manipulated variable in the above-mentioned feedback control system. Accordingly, the disturbance actually applied to the controlled system is compensated.

The process for estimating the disturbance in the observer will be explained with reference to FIG. 12. FIG. 12 shows the case of adopting the observer to a focus servo control system for a focus actuator included in an information reproducing apparatus such as CD (Compact Disk) player as the controlled system, specifically it shows a feedback servo loop formed in the focus servo control system.

In the information reproducing apparatus, information recorded on an optical disk is reproduced by irradiating the information recording surface of the optical disk with a light beam. In this process, the focus actuator is used for setting a focal position of the light beam. The focus actuator is an actuator for moving an objective lens in the direction perpendicular to the information recording surface of the optical disk to focus the light beam on the information recording surface.

The focus actuator supports the objective lens by an elastic member such as a plate spring. A characteristics equation showing the controlled system having such a configuration, in general, includes at least a second order term, a first order term and a zero order term. Moreover, the characteristics equation can include also a term of three order or more. Hereinafter, such a controlled system will be referred to as a spring-mass system.

In FIG. 12, the controlled system $U(s)$ is the focus actuator, and the controlled variable y is the position of the objective lens to be moved by the actuator.

The characteristics equation (transfer function) of the actuator can be represented in the second order delay system as:

$$U(s) = A \times wa^2 / (s^2 + 2 \times ka \times wa \times s + wa^2) \qquad (1).$$

Herein, A is the gain of the actuator (m/Ampere), ka is the viscosity braking coefficient of the actuator, and wa is the natural frequency of the actuator (rad/sec).

With the conversion sensitivity for outputting the focus error signal in the actuator (that is, the conversion sensitivity determined by the sensitivity of the photo detector in the information reproducing apparatus and the amplifying ratio of the error generation amplifier) considered to be the position detecting sensitivity Ke (volt/m), it can be represented as:

$$REF - y \times Ke = er \qquad (2).$$

Herein, REF is the desired value wherein the objective lens should be disposed, and er is the error in the above-mentioned feedback control system. As shown in FIG. 12, the error er obtained by the formula (2) is input to one of the input terminals of the observer.

On the other hand, the relationship between the manipulated variable (voltage value) u and the drive current i for driving the actuator in FIG. 12 can be represented as:

$$i = Kdr \times u \qquad (3).$$

Herein, Kdr (Ampere/Volt) is the voltage/current conversion sensitivity of the driver (to be driven by the manipulated variable u) for generating the drive current i. The drive current i is converted to the input voltage v by the current/voltage converter with the current/voltage conversion sensitivity Kiv (Volt/Ampere) so as to be input to the other input terminal of the observer as shown by the following formula (4):

$$v = Kiv \times I \qquad (4).$$

Herein, the above-mentioned current/voltage conversion sensitivity Kiv corresponds to the conversion sensitivity in feeding back the drive current i to the observer, that is, so-called return resistance.

In order to simplify the explanation, the disturbance at a certain position is considered to be the only disturbance to be applied on the actuator. As shown in FIG. 12, with the disturbance variable defined as d, it can be represented as:

$$i \times U(s) + d = y \qquad (5).$$

Herein, in the case the desired value REF is zero (REF=0) in the above-mentioned formula (2), it can be represented as:

$$y \times Ke = -er.$$

Therefore, from the above-mentioned formula (4), it can be represented as:

$$i = v/Kiv.$$

By erasing i and y from the above-mentioned formula (5), it can be represented as:

$$(v/Kiv) \times U(s) + d = -er/Ke.$$

By rearranging the formula, the disturbance variable d can be represented as the following formula (6) by using the input voltage v to be input to the observer corresponding to the drive current i and the error er:

$$d = -er/Ke - (v/Kiv) \times U(s) \qquad (6).$$

Herein, the parameters showing the inside of the observer as a model is represented as nominal values. In order to distinguish this from the actual control element, it is shown with an additional letter n. That is, the position detecting sensitivity Ke is represented as the position detecting sensitivity nominal value Ken, the voltage/current conversion sensitivity Kdr is represented as the voltage/current conversion sensitivity nominal value Kdrn, the current/voltage conversion sensitivity Kiv is represented as the current/voltage conversion sensitivity nominal value Kivn, and the controlled system U(s) is represented as the controlled system nominal value Un(s). The nominal value corresponding to the controlled system may be referred to, in general, as the internal model of the observer.

Incidentally, the nominal value is, for example, the torque rated value of the spindle motor for rotating the optical disk in an information reproducing apparatus, which is the value shown in the performance indication of the information reproducing apparatus, or the like. In the case, the performance indication is not provided, it is determined preliminarily by an experiment, or calculated by the theoretical calculation. The nominal value and the actual control element cannot always be equal due to factors such as insufficient accuracy of the determination or the calculation, aging, and temperature change.

From the above-mentioned formula (6), the estimated disturbance variable DOBS, which is the estimated variable of the disturbance d can be represented using the nominal values as:

$$DOBS = -er/Ken - (v/Kivn) \times Un(s) \qquad (7).$$

Accordingly, the estimated disturbance variable DOBS can be calculated from the input voltage v and the error er using the observer without detecting the actual disturbance d.

In FIG. 12, the disturbance d is suppressed by generating the manipulated variable u by multiplying the calculated estimated disturbance variable DOBS by the inverse transmission characteristics from the manipulated variable u to the controlled variable y $(1/\{Kdrn \times Un(s)\})$, further, converting the same into the compensated variable h by the robust filter R(s), and adding the compensated variable h to the variable obtained by applying the phase compensation to the error er by the phase compensator C(s).

In the case an information reproducing apparatus, or the like, including the above-mentioned focus actuator is provided for the public use, it is preferable to provide the observer with a simple configuration, and consequently, to reduce the production cost and the price of the product.

For example, in the case the observer is provided using a so-called DSP (Digital Signal Processor), the word length is preferably 16 bit rather than 32 bit for the public use. Moreover, the processing method is preferably the fixed point type rather than the floating point type for the public use.

However, in order to estimate the disturbance using the internal model corresponding to the controlled system of the spring-mass system by an observer with such a simple configuration, long estimating time is needed because the characteristics equation defining the internal model includes at least a second order term, a first order term and a zero order term as mentioned above. As a result, a problem is involved in an optical disk apparatus requiring an actuator with a high response frequency in that the process for estimating the disturbance cannot follow the process of the actuator, and thus the disturbance cannot be restrained effectively.

Moreover, in the case the disturbance is estimated by an observer with a simple configuration by using the internal model corresponding to the controlled system of the spring-mass system, much error can be included in the estimation result derived from the low processing ability of the observer itself. As a result, a problem arises in that the disturbance cannot be restrained with a high accuracy.

SUMMARY OF THE INVENTION

An object of the present invention is to provide a servo control apparatus with simple configuration at a low cost, capable of a feedback control to a controlled system while estimating a disturbance applied to the controlled system accurately and quickly.

A servo control apparatus in accordance with the present invention performs a feedback control to a controlled system having characteristics represented by a characteristic equation including at least a second order term, a first order term and a zero order term. The servo control apparatus includes a disturbance estimating device that has an internal model having characteristics represented by a characteristic equation including only a second order term, and that estimates a disturbance applied to the controlled system by using the internal model, thereby generating an estimated disturbance value; and a compensating device that compensates the disturbance on the basis of the estimated disturbance value.

In the servo control apparatus of the present invention, a disturbance applied to the controlled system having characteristics represented by a characteristic equation including at least a second order term, a first order term and a zero order term is estimated by using the internal model of the disturbance estimating device having characteristics represented by a characteristic equation including only a second order term. Although the characteristic equation of the controlled system does not completely coincide with that of the internal model of the disturbance estimating device, the disturbance can be estimated. Especially, it can be accurately estimated at least in a frequency band higher than the natural frequency of the controlled system. Furthermore, the characteristic equation of the internal model of the disturbance estimating device is simpler than that of the controlled system. Therefore, the disturbance can be easily and quickly estimated without the deterioration of the accuracy of the disturbance estimation, by using the disturbance estimating device with a simple structure.

In the servo control apparatus in accordance with the present invention, the internal model may include at least two integration elements, and at least one of the integration elements may be of an incomplete integration type. By using the integration element of the incomplete integration type, the saturation of the integration element can be prevented, so that the transitional characteristics of the feedback control can be improved, at least as compared with an internal model in which all of the integration elements are of a complete integration type.

In the servo control apparatus in accordance with the present invention, the disturbance estimating device may include a robust filtering device having second or more order low-pass filtering characteristics. According to the robust filtering device, the deterioration of the accuracy of the disturbance estimation due to the incompleteness in the internal mode or the controlled system, the observation noise, or the like can be prevented.

In the servo control apparatus in accordance with the present invention, the disturbance estimating device may includes a digital processing unit for estimating the disturbance by using a digital manipulated variable at a current sample timing, a digital error at the current sample timing and a digital state variable at a previous sample timing. According to such a digital configuration, the accuracy of the disturbance estimation can be improved. Furthermore, the disturbance estimating device can be realized as a DSP.

Another object of the present invention is to provide a servo control method capable of a feedback control to a controlled system with a simple configuration while estimating a disturbance applied to the controlled system accurately and quickly.

A servo control method in accordance with the present invention is a method for a feedback control to a controlled system having characteristics represented by a characteristic equation including at least a second order term, a first order term and a zero order term. The method includes the processes of estimating a disturbance applied to the controlled system by using the internal model having characteristics represented by a characteristic equation including only a second order term, thereby generating an estimated disturbance value; and compensating the disturbance on the basis of the estimated disturbance value.

The nature, utility, and further feature of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Hereinafter, preferable embodiments of the present invention will be described with reference to the drawings.

The cases wherein the present invention is adopted to information reproducing apparatus comprising a feedback control system including an observer will be explained. The information reproducing apparatus to be described below are an apparatus for reproducing the information recorded on an optical disk. In the information reproducing apparatus, the feedback control system including the observer is used for the focus servo control and the tracking servo control of a light beam.

(I) Principle of the Present Invention

Figure 1A:
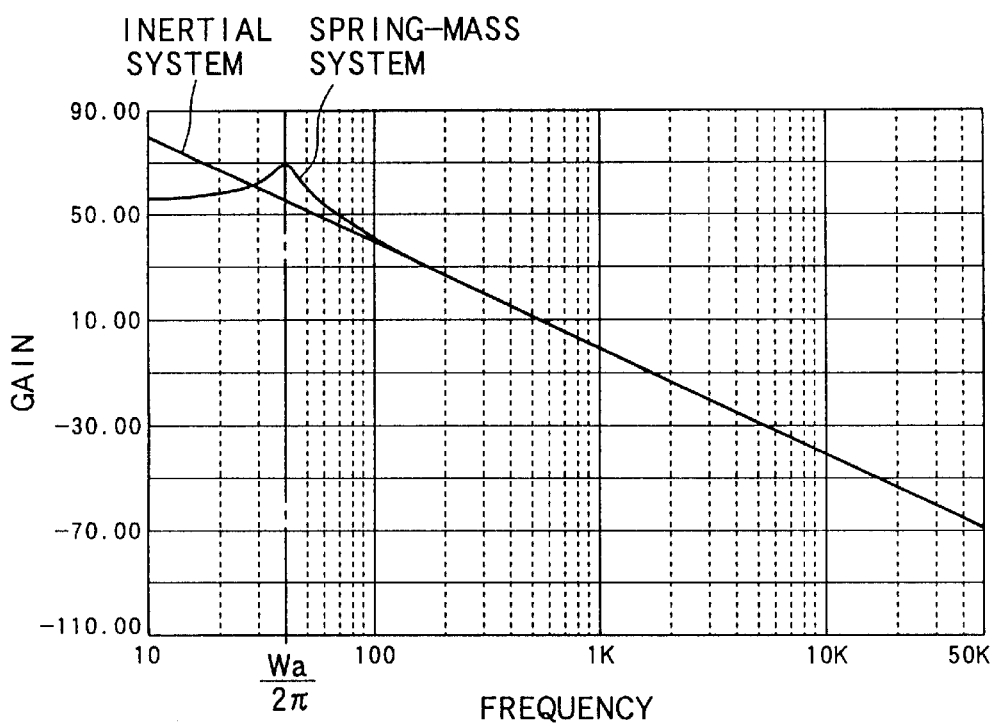
FIG. 1A is a graph showing the gain-frequency. characteristics of the controlled system of the spring-mass system and the controlled system of the inertial system.
Figure 1B:
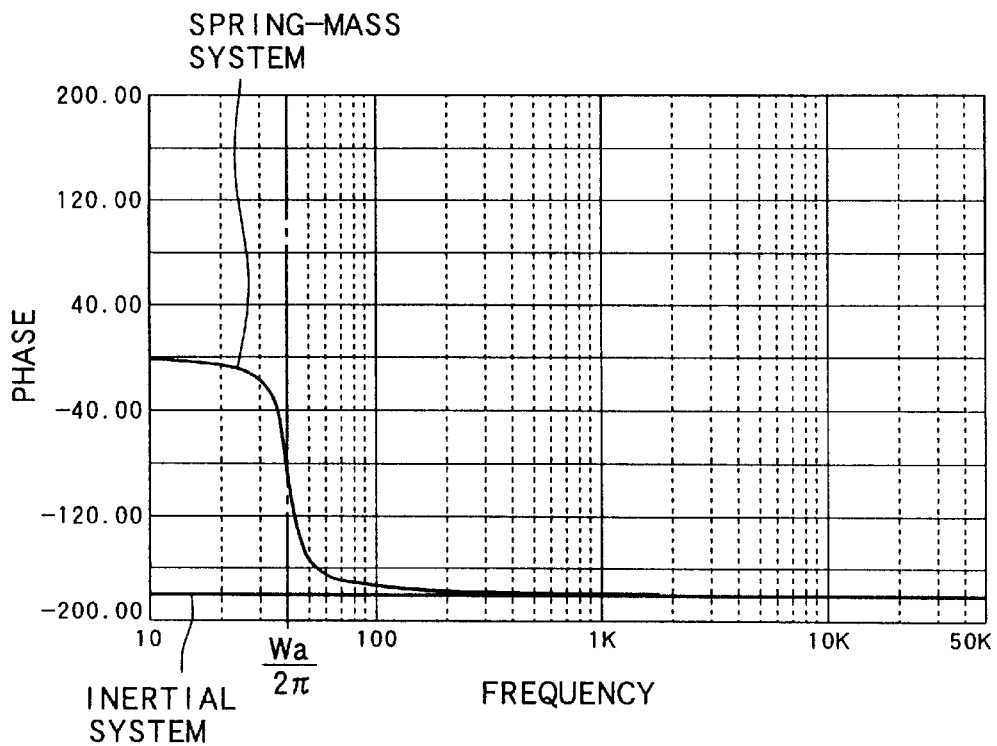
FIG. 1B is a graph showing the phase-frequency characteristics of the controlled system of the spring-mass system and the controlled system of the inertial system.
Figure 2A:
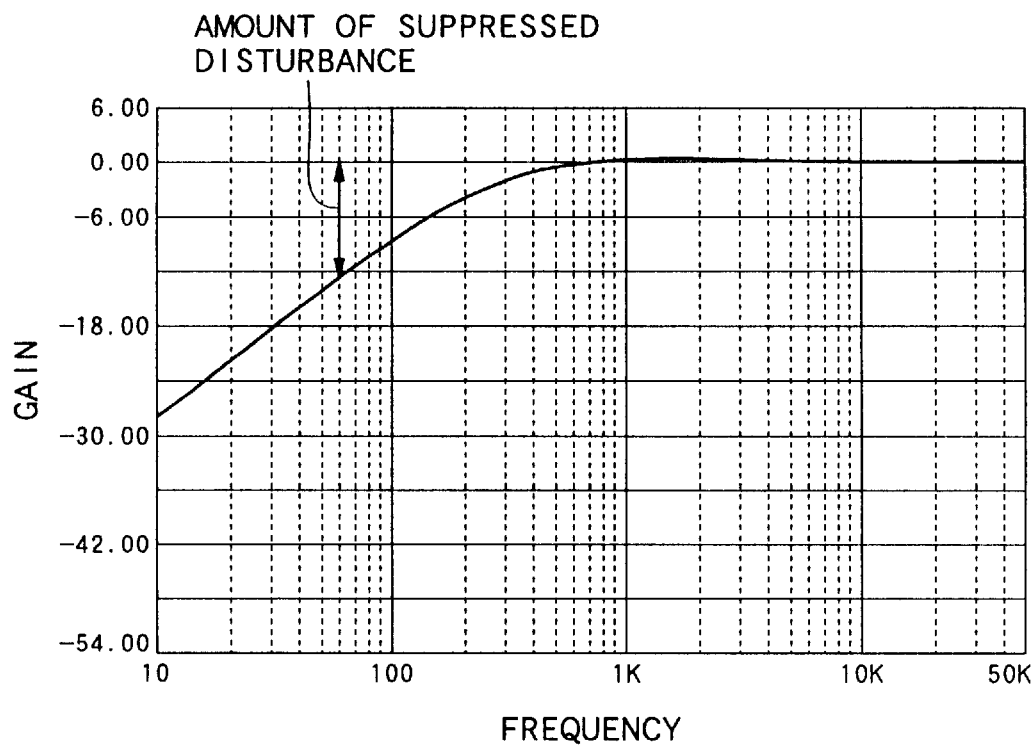
FIG. 2A is a graph showing the gain-frequency characteristics from the disturbance to the error in the case the controlled system and the internal model of the observer are both of the inertial system.
Figure 2B:
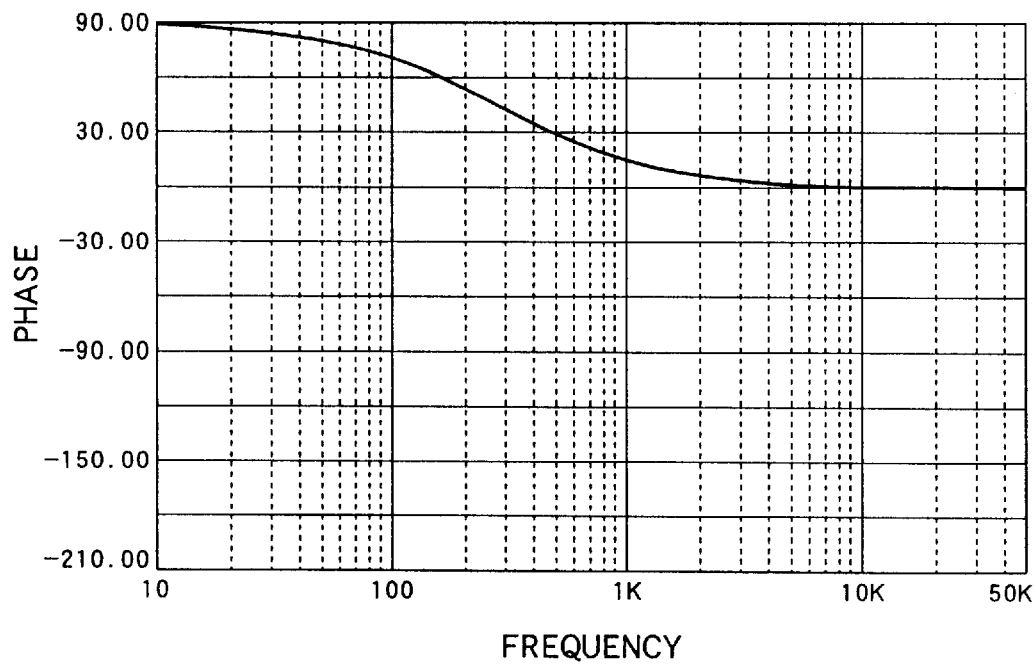
FIG. 2B is a graph showing the phase-frequency characteristics from the disturbance to the error in the case the controlled system and the internal model of the observer are both of the inertial system.
Figure 3A:
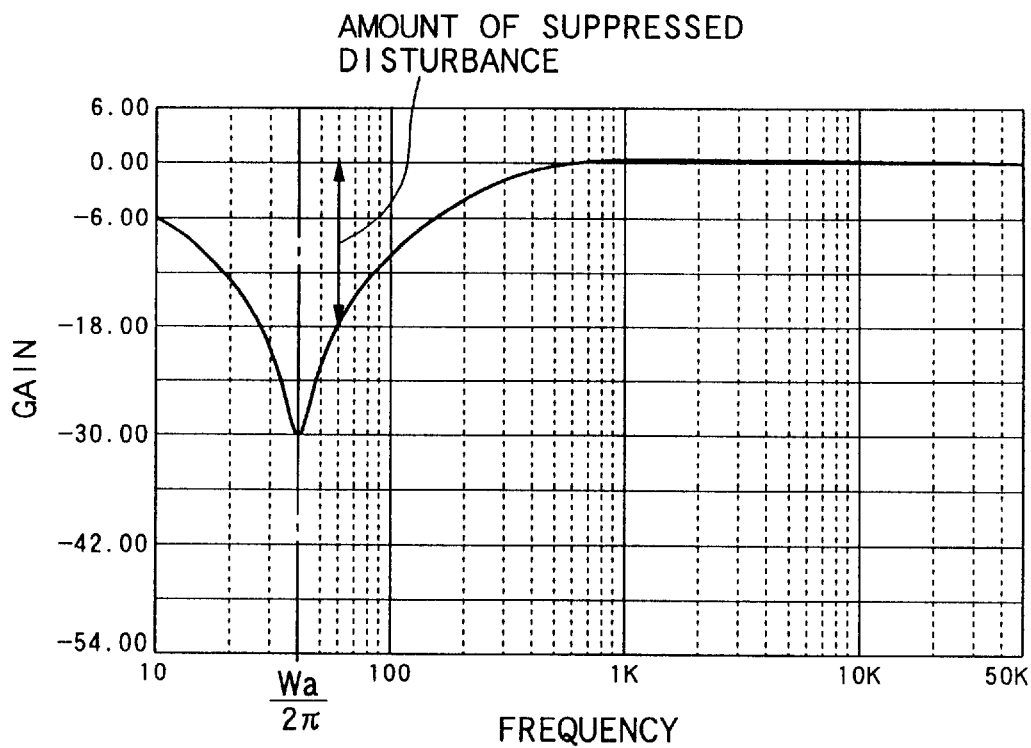
FIG. 3A is a graph showing the gain-frequency characteristics from the disturbance to the error in the case the controlled system is of the spring-mass system and the internal model of the observer is of the inertial system.
Figure 3B:
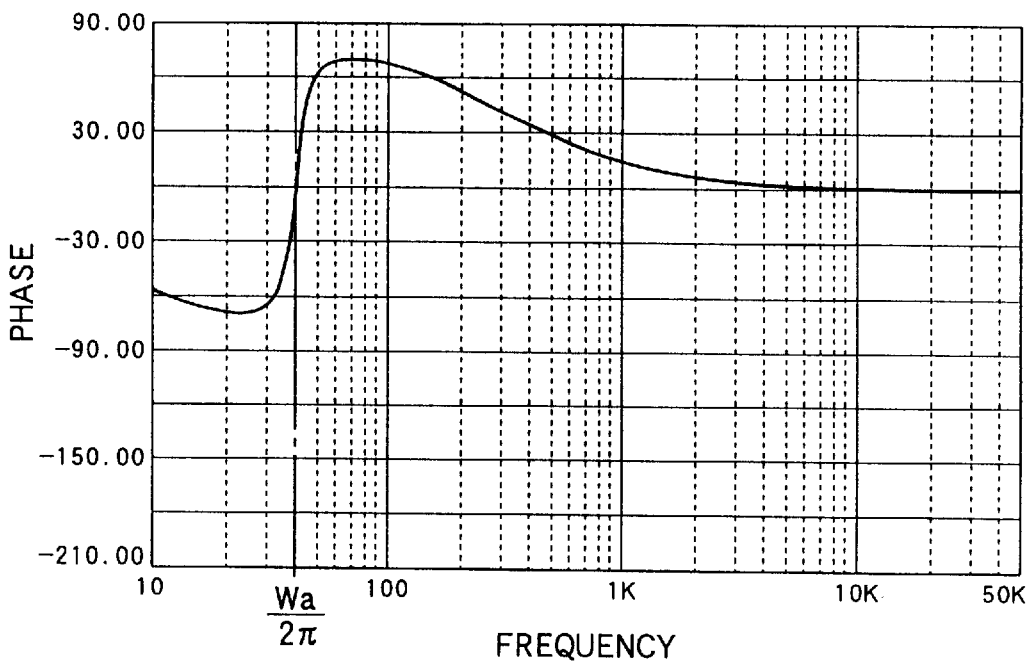
FIG. 3B is a graph showing the phase-frequency characteristics from the disturbance to the error in the case the controlled system is of the spring-mass system and the internal model of the observer is of the inertial system.

The principle of the present invention will be explained. FIGS. 1A and 1B show the transmission characteristics of the controlled system of the spring-mass system, and the transmission characteristics of the controlled system of the inertial system. FIG. 1A shows the frequency characteristics of the gain of both systems, and FIG. 1B shows the frequency characteristics of the phase of both systems. FIGS. 2A and 2B show the transmission characteristics from the disturbance predicted to be applied on the controlled system to the error in the case the controlled system and the internal model of the observer are both of the inertial system. FIG. 2A shows the frequency characteristics of the gain, and FIG. 2B shows the frequency characteristics of the phase. FIGS. 3A and 3B show the transmission characteristics from the disturbance predicted to be applied on the controlled system to the error in the case the controlled system is of the spring-mass system and the internal model of the observer is of the inertial system. FIG. 3A shows the frequency characteristics of the gain, and FIG. 3B shows the frequency characteristics of the phase.

The inertial system denotes a system, whose characteristics equation is defined including only a second order term.

A focus actuator or a tracking actuator (hereinafter, they are referred to only as an actuator) in an information reproducing apparatus in the following explanation corresponds to the controlled system of the spring-mass system. The transmission characteristics of the controlled system of the spring-mass system are, in general, defined by approximation to the second order delay system. That is, the transmission function corresponding to the controlled system of the spring-mass system can be represented as the following formula:

$$U(s) = A \times wa^2 / (s^2 + 2 \times k \times wa \times s + wa^2) \tag{8}$$

Herein, A is, for example, the gain of the actuator (m/Ampere), k is, for example, the viscosity braking coefficient, and wa is, for example, the natural frequency of the actuator (rad/sec).

On the other hand, the transmission function representing the transmission characteristics of the controlled system of the inertial system can be defined, in general, using only the second order term as follows:

$$i\ U(s)=A \times wa^2/s^2 \qquad (9).$$

Next, the transmission characteristics of each of the controlled system of the spring-mass system and the controlled system of the inertial system represented by the above-mentioned formulae (8) and (9) will be discussed.

As shown in FIGS. 1A and 1B, in the frequency band higher than the natural frequency wa of the actuator, it is observed that the transmission characteristics of the controlled system of the spring-mass system and the transmission characteristics of the controlled system of the inertial system substantially coincide. Accordingly, in the frequency band higher than the natural frequency wa, the disturbance to be applied on the controlled system U(s) of the spring-mass system can be estimated by the observer having the internal model of the inertial system.

Furthermore, with the assumption that the acceleration disturbance is the only disturbance to be applied on the controlled system of the spring-mass system, the transmission characteristics from the disturbance DISA to the error er will be discussed.

The transmission characteristics represent the disturbance suppression characteristics of the observer. As shown by the arrow in the graphs of FIGS. 2A and 3A, the distance from a point on the characteristic line to the 0 dB line shows the amount of suppressed disturbance. The longer the distance is, the better the disturbance suppression characteristics are.

In comparison of FIGS. 2A and 3A with each other, in the frequency band lower than the natural frequency wa of the actuator, the characteristics of both of them do not coincide. It is observed that the case with the controlled system and the internal model of the observer coincide completely (the case of FIG. 2A) has superior suppression characteristics in the frequency band lower than the vicinity of the natural frequency wa.

In contrast, in the frequency band higher than the vicinity of the natural frequency wa, the characteristics shown in FIG. 2A and the characteristics shown in FIG. 3A substantially coincide with each other. This means that the disturbance suppression characteristics of the observer in the frequency band higher than the vicinity of the natural frequency wa are substantially same either in the case the controlled system and the internal model of the observer are both of the inertial system, or in the case the controlled system is of the spring-mass system and the internal model of the observer is of the inertial system.

As mentioned above, in the frequency band higher than the natural frequency wa of the actuator, the disturbance to be applied on the controlled system of the spring-mass system can be estimated by the observer having the internal model of the inertial system. That is, even in the case the characteristics equation of the internal model of the inertial system and the characteristics equation of the controlled system of the spring-mass system do not coincide with each other, the disturbance suppression characteristics in the frequency component higher than the natural frequency wa of the actuator can be improved by the observer having the internal model of the inertial system.

It is known that the main component of the disturbance in the focus servo control or the tracking servo control of an optical disk (or a magneto-optical disk) is the acceleration disturbance derived from the rotation of the optical disk. Therefore, it contains much frequency component higher than the natural frequency wa. Such a high frequency component of the disturbance can be accurately estimated and can be effectively suppressed by the observer having the internal model of the inertial system, although the actuator is the spring-mass system.

Furthermore, the inertial system is simpler than the spring-mass system. Therefore, the estimation process of the disturbance can be simplified by the observer having the internal model of the inertial system. Accordingly, the disturbance can be estimated accurately and quickly using an observer with a short word length or of the fixed point type.

Incidentally, the disturbance of a frequency component lower than the natural frequency wa can be suppressed by a phase compensator usually contained in the loop of the feedback control to the extent not influential to the servo control operation.

(II) First Embodiment

The first embodiment according to the present invention will be explained with reference to FIGS. 4 and 5. The first embodiment to be explained below is an embodiment wherein the present invention is adopted to the process in the pickup controller for executing the focus servo control in the pickup in the information reproducing apparatus.

The configuration of the information reproducing apparatus according to the first embodiment will be described with reference to FIG. 4. FIG. 4 shows the schematic configuration of the information reproducing apparatus S according to the first embodiment.

Figure 4:
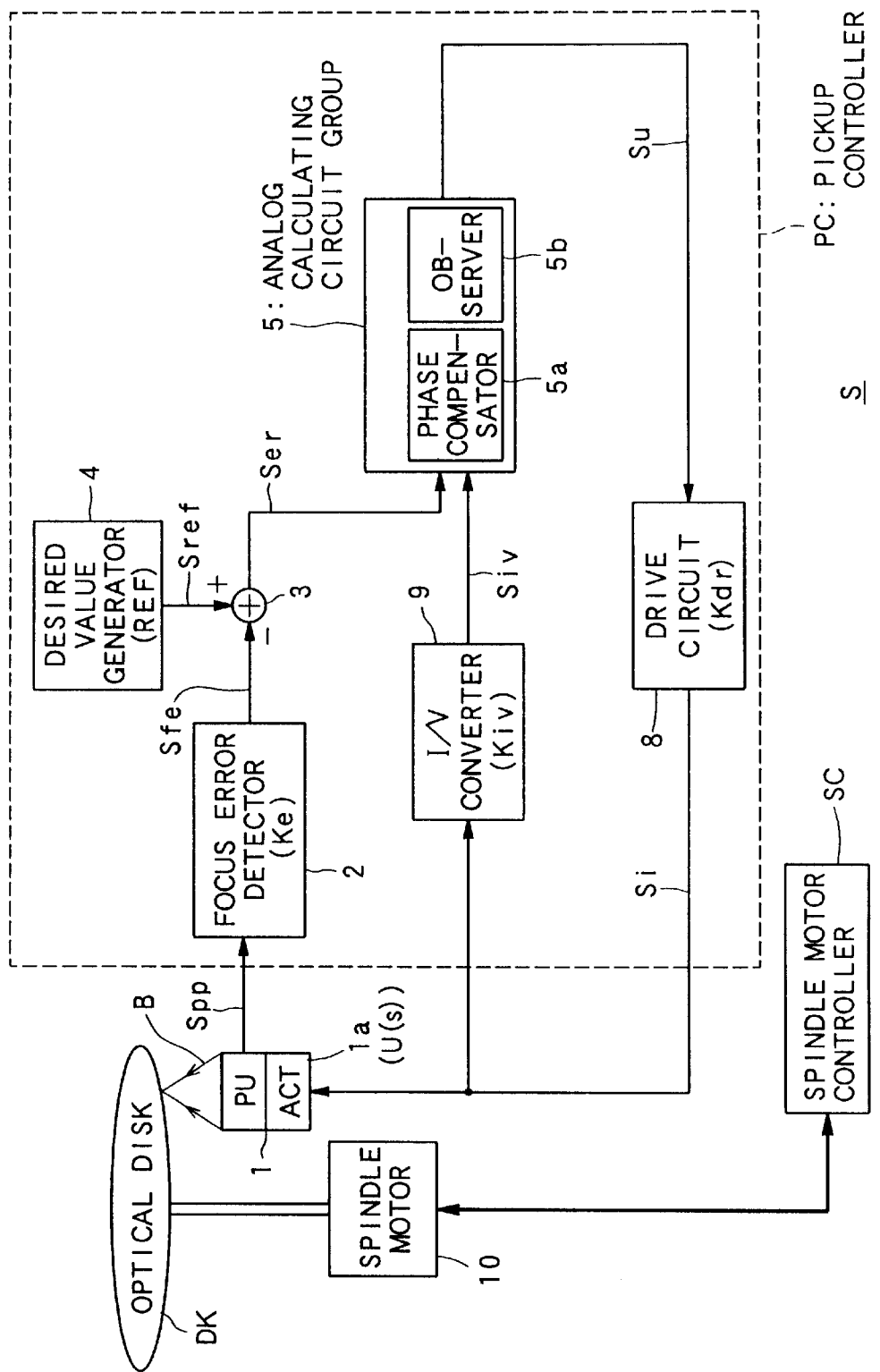
FIG. 4 is a block diagram showing a schematic configuration of an information reproducing apparatus according to a first embodiment.

As shown in FIG. 4, the information reproducing apparatus S includes a pickup (PU) 1, a pickup controller PC, a spindle motor 10, and a spindle motor controller SC.

Further, the pickup controller PC includes a focus error detector 2, a subtractor 3, a desired value generator 4, an analog calculating circuit group 5, a drive circuit 8, and an I-V (current-to-voltage) converter 9.

The analog calculating circuit group 5 includes a phase compensator 5a and an observer 5b. The phase compensator 5a and the Observer 5b are realized as the internal structure of the analog calculating circuit group 5 by a plurality of operational amplifiers, resistors, capacitors, and the like, included in the analog calculating circuit group 5. The observer 5b and the phase compensator 5a can be provided as independent circuits.

FIG. 4 shows only the part of the information reproducing apparatus S related to the servo control according to the present invention. In the actual information reproducing apparatus S are included a reproducing process part for reproducing the information recorded on the optical disk DK based on the detection signal from the pickup, a display part for displaying the operation state of the information reproducing apparatus S, an operation part for inputting the process to be executed by the information reproducing apparatus S, or the like, in addition to the members shown in FIG. 4.

The pickup 1 includes an actuator (ACT) 1a for executing the focus servo control by moving an objective lens (not illustrated) in the direction perpendicular to the information recording surface of the optical disk DK.

Next, the outline of the operation will be explained.

The pickup 1 radiates the light beam B to the information recording surface of the optical disk DK while executing the tracking servo control and the focus servo control, receives the reflected light of the light beam B by a photo detector (not illustrated), or the like so as to generate a detection signal Spp, and outputs the same to the focus error detector 2. The actuator 1a corresponds to the controlled system (controlled system of the spring-mass system) U(s) in FIG. 5.

The focus error detector 2 generates a focus error signal Sfe indicating the distance between the focal position of the light beam B and the position of the information recording surface in the direction perpendicular to the information recording surface based on the detection signal Spp, and outputs the same to one of the terminal of the subtractor 3. The error signal detection sensitivity in the focus error detector 2 (that is, the output voltage value of the focus error detector 2 to be changed when the position of the lens moves by a unit distance) corresponds to the position detecting sensitivity Ke (volt/m) in FIG. 5.

Further, as the method for detecting the focus error in the focus error detector 2, the so-called SSD (Spot Size Detection) method or the astigmatism method, or the like, may be used.

At the same time, the desired value generator 4 generates and outputs a desired value signal Sref indicating the position where the objective lens should be positioned (that is, the position in the direction perpendicular to the information recording surface where the objective lens should be positioned in order that the focal position of the light beam B can be on the information recording surface). The desired value signal Sref corresponds to the desired value REF in FIG. 5.

The subtractor 3 subtracts the value of the focus error signal Sfe for the value of the desired value signal Sref, generates an error signal Ser indicating the positional error concerning the focal position of the light beam B thereby obtained, and outputs the same to the analog calculating circuit group 5. This positional error corresponds to the error er in FIG. 5.

The analog calculating circuit group 5 generates a manipulation signal Su for driving the drive circuit 8 according to the operation of the phase compensator 5a and the observer 5b, and outputs the same to the drive circuit 8. At the time, the analog calculating circuit group 5 executes the function as the phase compensator 5a and the observer 5b according to the transmission characteristics based on the Laplacean(s).

The drive circuit 8 amplifies the manipulation signal Su as a voltage signal, generates a drive signal Si having the current value corresponding to the voltage value of the amplified manipulation signal Su, and outputs the same to the actuator 1a. According to the drive signal Si, the actuator 1a moves the objective lens. Furthermore, the drive signal Si is output also to the I-V converter 9. The drive signal Si corresponds to the drive current i in FIG. 5. The conversion sensitivity of the drive circuit 8 (that is, the current value of the drive signal S corresponding to the unit voltage of the manipulation signal Su) corresponds to the conversion sensitivity Kdr (Ampere/Volt) in FIG. 5.

Furthermore, the I-V converter 9 converts the current value of the drive signal Si to the voltage value, and outputs the same to the analog calculating circuit group 5 as the drive voltage Siv. The conversion sensitivity of the I-V converter 9 (that is, the voltage value of the drive voltage signal Siv corresponding to the unit current of the drive signal Si) corresponds to the conversion sensitivity Kiv (Volt/Ampere) in FIG. 5.

Figure 12:
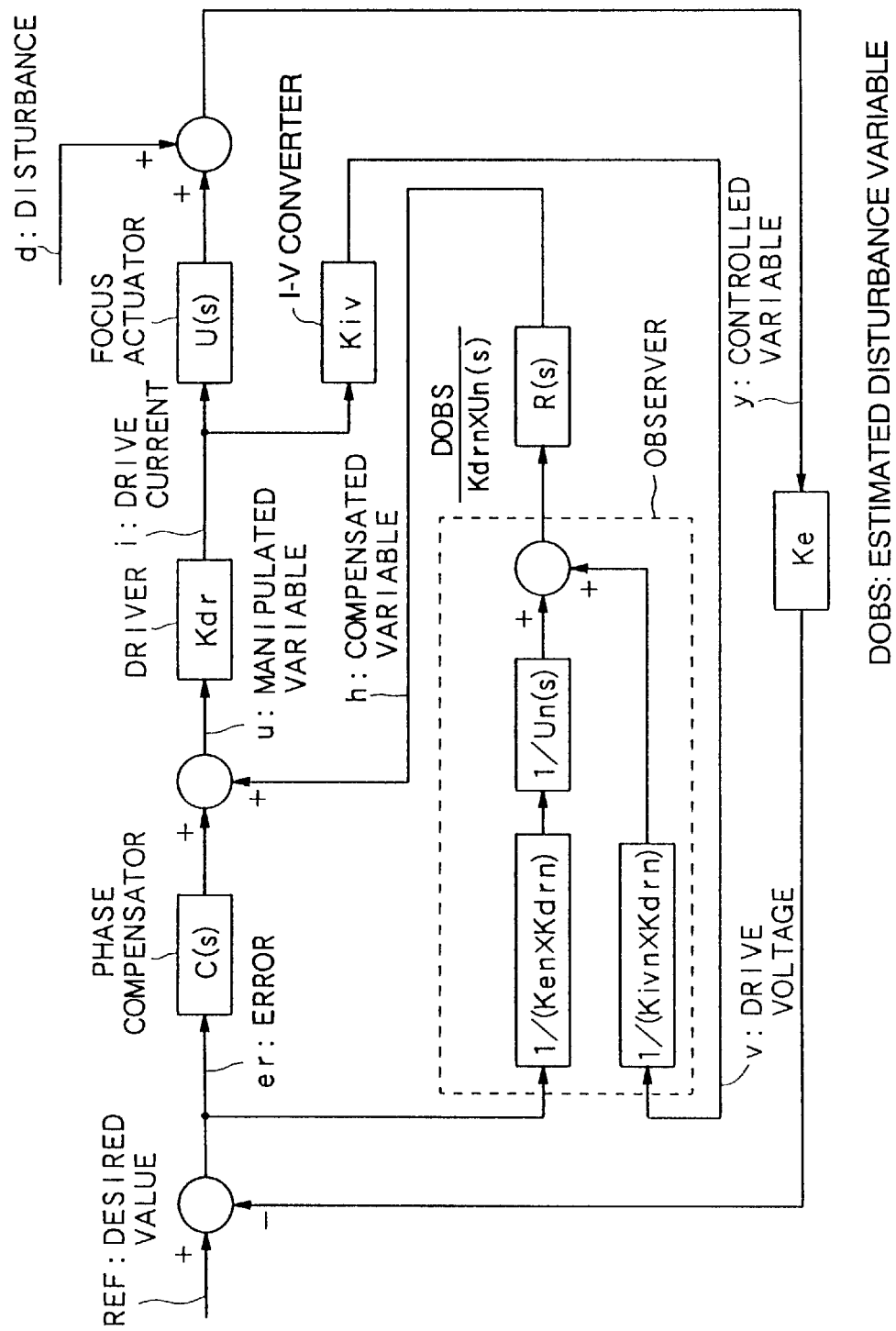
FIG. 12 is a block diagram showing a configuration of a control system using a conventional observer.

The feedback control in the control system including the pickup controller PC and the actuator 1 a will be explained with reference to FIG. 5. FIG. 5 is a block diagram including the internal block diagram showing the observer as well as indicating the entirety of the feedback control in the control system including the pickup controller PC and the actuator 1a. Moreover, in FIG. 5, the control elements same as those in the conventional feedback control system shown in FIG. 12 are applied with the same numerals.

Since the controlled system U(s) is the actuator 1a in the first embodiment, the controlled variable y is a position of the objective lens in the direction perpendicular to the information recording surface of the optical disk DK.

The transmission function of the actuator can be approximated as the second order delay system as follows.

$$U(s)=A \times wa^2/(s^2+2 \times k \times wa \times s + wa^2).$$

Herein, A is, for example, the gain of the actuator (m/Ampere), k is, for example, the viscosity braking coefficient, and wa is, for example, the natural frequency of the actuator (rad/sec).

In the case the position detecting sensitivity as the focus error signal detecting sensitivity in the focus error detector 2 is Ke (Volt/m), it can be represented as:

$$REF-y \times Ke=er \qquad (10).$$

Herein, er is the error and REF is the desired value. The error er obtained by the formula (10) is input to one of the input terminals of the observer 5b.

With the voltage current conversion sensitivity in the drive circuit 8 defined as Kdr (Ampere/Volt), the relationship between the manipulated variable u and the drive current i can be represented as:

$$i=Kdr \times u \qquad (11).$$

The drive current i is converted to the drive voltage signal Siv corresponding to the input voltage v by the I-V converter 9, whose current/voltage conversion sensitivity is Kiv (Volt/Ampere), and input to the other input terminal of the observer 5b. That is, $$v=Kiv \times i \qquad (12).$$

Figure 5:
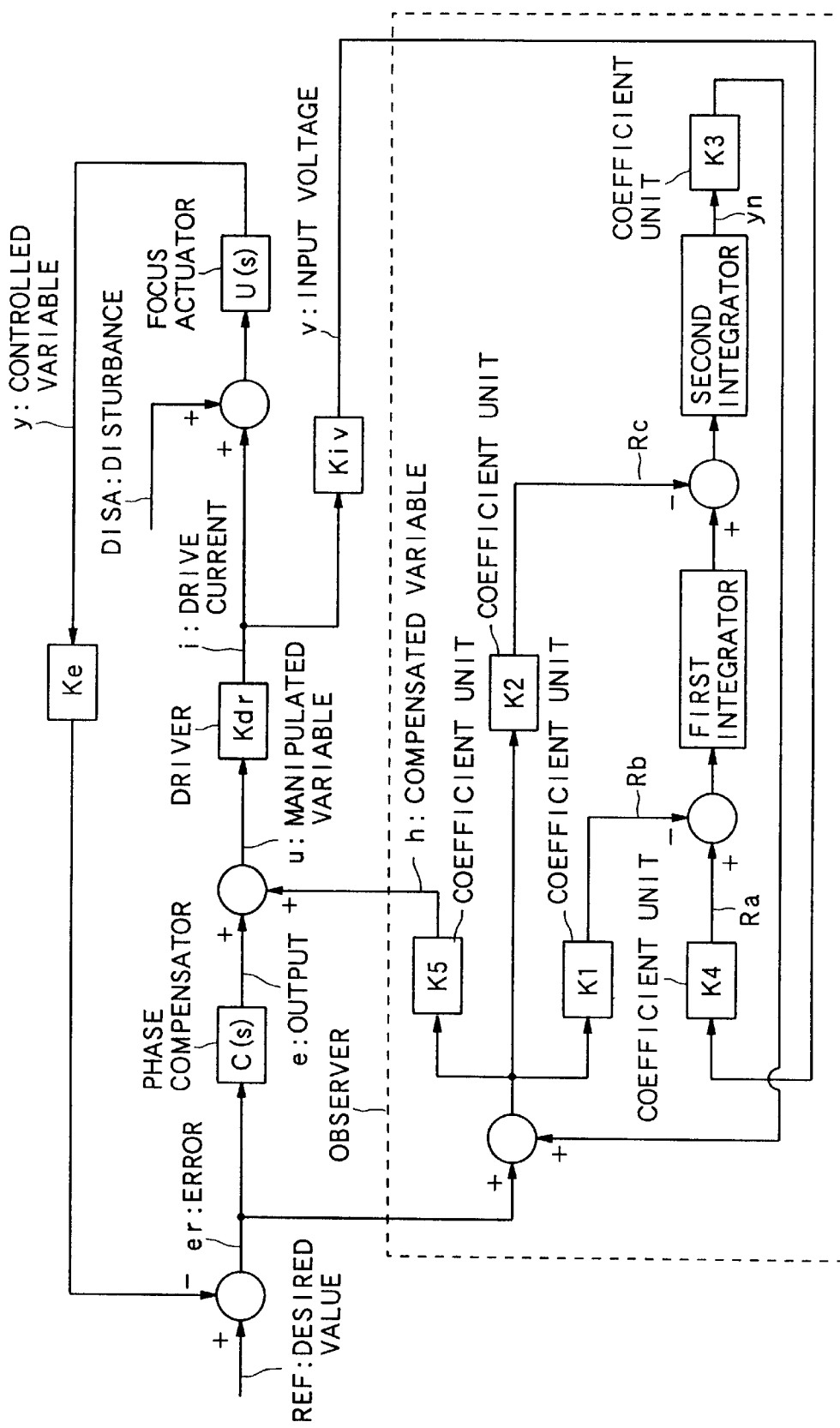
FIG. 5 is a block diagram showing a configuration of a control system of the first embodiment.

Here, the observer of the first embodiment includes five coefficient units for each generating coefficients k1 to k5, a first integrator, a second integrator, and three adder-subtractors as shown in the block diagram of FIG. 5. The observer generates the compensated variable h for correcting the manipulated variable u by estimating the disturbance using the error er and the input voltage v, and adding the same to the manipulated variable u.

More specifically, the input voltage v is multiplied by the coefficient k4 (the result is defined to be Ra). Moreover, the estimated position yn output from the second integrator is multiplied by the coefficient k3, the error er is added to the multiplication result, and the addition result is multiplied by the coefficient k1 (the result is defined to be Rb). Then, Rb is subtracted from Ra. The subtraction result is input to the first integrator.

Furthermore, the estimated position yn output from the second integrator is multiplied by the coefficient k3, the error er is added to the multiplication result, and the addition result is multiplied by the coefficient k2 (the result is defined to be Rc). Then, Rc is subtracted from the output of the first integrator. The subtraction result is input to the second integrator.

Moreover, the estimated position yn is multiplied by the coefficient k3, the error er is added to the multiplication result, and the addition result is multiplied by the coefficient k5. The multiplication result is output form the observer 5b as the compensated variable h. Then, the compensated variable h is added to the output signal of the phase compensator for compensating the acceleration disturbance DISA.

With the assumption that the acceleration disturbance DISA is applied to the actuator $1a$ (controlled system $U(s)$), the controlled variable y can be represented as:

$$y=(i+\text{DISA})\times U(s) \quad (13)$$

The values of the above-mentioned coefficients k1 to k5 for realizing the operation of the observer $5b$ will be discussed. In the following discussion, the transmission characteristics of each integrator is represented by 1/s, and the output of the second integrator shown in FIG. 5 is represented by the estimated position yn of the actuator $1a$. At the time, the above-mentioned acceleration disturbance DISA is included in the estimated position yn.

In the observer $5b$ shown in the block diagram of FIG. 5, $$(er+yn\times k3)\times k5=h \quad (14),$$

and $$[\{Kiv\times i\times k4-(er+yn\times k3)\times k1\}\times(1/s)-(er+yn\times k3)\times k2]\times(1/s)=yn \quad (15)$$

are satisfied. From the above-mentioned formulae (11) and (13), $$y=(Kdr\times u+\text{DISA})\times U(s) \quad (13a)$$

is satisfied. Furthermore, with the desired value REF defined to be "0", from the above-mentioned formula (10), $$-y\times ke=er \quad (10a)$$

is satisfied.
By substituting this formula into the formula (14), $$(-y\times Ke+yn\times k3)\times k5=h$$

is satisfied.
By changing the formula, $$yn\times k3=h/k5+y\times Ke \quad (14a)$$

is provided.
By substituting this formula and the formula (10a) to the formula (15), $$[\{Kiv\times i\times k4-(-y\times Ke+h/k5+y\times Ke)\times k1\}\times(1/s)-(-y\times Ke+h/k5+y\times Ke)\times k2]\times(1/s)=(h/k5+y\times Ke)/k3$$

is provided.
By rearrange this formula by multiplying both members by $s^2$, $$Kiv\times i\times k4-(h/k5)\times k1-(h/k5)\times k2\times s=(h/k5+y\times Ke)\times s^2/k3$$

is provided. By erasing i for rearrangement using this formula and the formula (11), $$kiv\times k4\times Kdr\times u=(h/k5+y\times Ke)\times s^2/k3+(h/k5)\times k2\times s+(h/k5)\times k1 \quad (15a)$$

is provided.

Herein, considering the case of suppressing the disturbance DISA using only the compensated variable h with the loop of the phase compensator $C(s)$ switched off, if the output e of the phase compensator $C(s)$ is zero, $$e=er\times C(s) \quad (16),$$

and thus, $$u=e+h \quad (17)$$

can be obtained. From the formula (17), since u=h when e=0, by multiplying the formula (15) by 1/u, $$Kiv\times k4\times Kdr=\{1/(k3\times k5)+(Ke/k3)\times y/u\}\times s^2+(k2/k5)\times s+(k1/k5) \quad (15b)$$

is provided. By erasing y for rearrangement from the formula and the formula (13a), $$Kiv\times k4\times Kdr=s^2/(k3\times k5)+(Ke/k3)\times Kdr+\text{DISA}/u)\times U(s)\times s^2\times(k2/k5)\times s+(k1/k5),$$

$$Kdr\times(Kiv\times k4-U(s)\times s^2\times Ke/k3)-(Ke/k3)\times(\text{DISA}/u)\times U(s)\times s^2=(s^2/k3+k2\times s+k1)/k5 \quad (15c)$$

is obtained. In the left hand side of the formula (15c), by changing the internal model $Un(s)$ in the observer $5b$ corresponding to the controlled system $U(s)$ from the spring-mass system to the inertial system for approximation, $$Un(s)=A\times wa^2/s2 \quad (9a)$$

is provided. And further, by erasing $U(s)$ by the assumption that $U(s)≈Un(s)$ in the formula (15c), $$Kdr\times(Kiv\times k4-A\times wa^2\times Ke/k3)-(Ke/k3)\times(\text{DISA}/u)\times A\times wa^2=(s^2/k3+k2\times s+k1)/k5 \quad (15d)$$

is provided.
Furthermore, with the assumption that:

$$Kiv\times k4-A\times wa^2\times Ke/k3=0 \quad (18),$$

and $$k4=1/Kiv \quad (19)$$

in the left hand first term of the formula (15d), $$k3=A\times wa^2\times Ke \quad (20)$$

is provided. Consequently, the above-mentioned formula (15d) becomes $$-(Ke/k3)\times(\text{DISA}/u)\times A\times wa^2=(s^2/k3+k2\times s+k1)/k5.$$

Therefore, $$-u/\text{DISA}=(k5\times Ke\times A\times wa^2/k3)/(s^2/k3+k2\times s+k1)$$

is provided.
From this formula and the formula (20), $$-u/\text{DISA}=k5/(s^2/k3+k2\times s+k1) \quad (21)$$

is provided. Here, the formula (21) represents the transmission characteristics from the acceleration disturbance DISA to the manipulated variable u (in other words, the compensated variable h when e=0), and from the right hand side thereof, it is learned that these transmission characteristics are the second order low pass filter characteristics.

On the other hand, from the formula (13a), in order that the controlled variable y is not influenced by the acceleration disturbance DISA, $$Kdr\times u+\text{DISA}=0 \quad (22)$$

needs to be satisfied. In this case, the acceleration disturbance DISA is suppressed completely. That is, in order to completely suppress the acceleration variable DISA, from the formula (22), $$-u/\text{DISA}=1/Kdr \quad (22a)$$

needs to be satisfied.

However, in the actual observer 5b, it is difficult to completely satisfy the above-mentioned formula (22a) due to the incompleteness in modeling the controlled system, the observation noise, or the like.

Then, the above-mentioned formula (22a) is satisfied approximately by using a so-called robust filter R(s)

The transmission characteristics of the robust filter R(s) is defined to be:

$$R(s)=wr^2/(s^2+2\times kr\times wr\times s+wr^2) \quad (23).$$

Herein, kr is the dumping factor of the robust filter, and wr is the cut off frequency (rad/sec) thereof. By approximating the formula (22a) using the robust filter, $$-u/DISA=(1/Kdr)\times R(s) \quad (22b)$$

is provided. From the formula (22b) and the formula (21), $$k5\times k3/(s^2+k2\times k3\times s+k1\times k3)=(1/Kdr)\times R(s) \quad (24)$$

is obtained.
From the formulae (23) and (24), $$k1\times k3=wr^2 \quad (25),$$

$$k2\times k3=2\times kr\times wr \quad (26),$$

and $$k3\times k5=1/Kdr \quad (27)$$

are provided.
Accordingly, by erasing k3 in the formulae (25) to (27) using the formula (18), $$k1=wr^2/(A\times wa^2\times Ke) \quad (28),$$

$$k2=2\times kr\times wr/(A\times wa^2\times Ke) \quad (29),$$

and $$k5=1/(Kdr\times A\times wa^2\times Ke) \quad (30)$$

are provided.

According to the discussion so far, by approximating the internal model in the observer 5b corresponding to a controlled system U(s) from the spring-mass system to the inertial system, introducing a robust filter R(s) having the second order low pass filter characteristics, and further, having the coefficients k1 to k5 of the values represented by the formulae (28), (29), (19), (20), and (30), respectively, an observer 5b capable of accurately estimating the acceleration disturbance DISA to be applied to the actuator 1a (controlled system of the spring-mass system) at least in the frequency range higher than the natural frequency wa can be realized. Furthermore, the configuration of such an observer 5b can be simplified.

The compensated variable h generated by the observer 5b is added to the manipulated variable u, and consequently, a manipulation signal Su is generated. Accordingly, the drive circuit 8 is driven, a drive signal Si is generated, and the actuator 1a is driven according to the drive signal Si.

Thereby, the acceleration disturbance can be suppressed compared with the case wherein the actuator 1a is controlled only by the ordinary feedback control, and thus the control performance, such as the accuracy, can be improved.

On the other hand, by using the PID control as the compensation control of the above-mentioned phase compensator C(s), $$C(s)=Kp+Ki/s+Kd\times s$$

is provided.
Herein, Kp is a proportional term, Ki is an integration term, and Kd is a differentiation term. The disturbance of a frequency component lower than the natural frequency wa of the actuator 1a is suppressed by the phase compensator 5a to the extent not influential to the servo control operation.

As heretofore explained, the observer 5b according to the first embodiment estimates the acceleration disturbance DISA using the internal model of the inertial system in the frequency band higher than the natural frequency wa in the controlled system of the spring-mass system. Therefore, compared with the case of using the internal model defined by the characteristics equation including terms other than a second order term, the configuration of the observer 5b can be simplified, and thus the accurate and quick estimation of the disturbance can be realized.

Moreover, since the acceleration disturbance DISA is estimated using the robust filter having the second order low pass filter characteristics, the disturbance can be estimated accurately also in the case the incompleteness of the internal model or the estimation noise is involved in the feedback control system.

Furthermore, in the first embodiment, the feedback control can be executed in the focus servo control with a high accuracy in a simple and inexpensive configuration while suppressing the disturbance further accurately.

Moreover, for example, in the case of adopting a system for estimating the disturbance by generating the inverse function of the internal model as the observer, since the controlled system is of the second order delay system, a differentiator is required in some cases. However, according to the present invention, the differentiator can be eliminated. In the case the differentiator is provided, the countermeasure for the noise is required for reducing the noise derived from the existence of the differentiator. For example, measures should be taken sufficiently for the clock noise, the power source noise, or interference from the other members in the information reproducing apparatus. However, according to the present invention, since a differentiator is not necessary, these countermeasures for the noise are not required as well, and thus the cost required for the countermeasures for the noise can be cut back.

Experiment results show that according to the configuration wherein the disturbance to be applied on the controlled system of the spring-mass system is estimated by the observer 5b having the internal model of the inertial system for suppression as in the above-mentioned first embodiment, the disturbance in the frequency band lower than the natural frequency wa of the actuator can also be suppressed as shown in FIG. 3A.

Moreover, although the case wherein the present invention is adopted to the focus servo control with respect to the objective lens in the pickup 1 has been explained in the above-mentioned first embodiment, the present invention can be adopted also to the tracking servo control with respect to the objective lens (specifically, the DPD (Differential Phase Detection) method or the tracking servo control using the three beam method) with the similar configuration.

(III) Second Embodiment

The second embodiment according to the present invention will be explained with reference to FIGS. 6 to 8.

Figure 6:
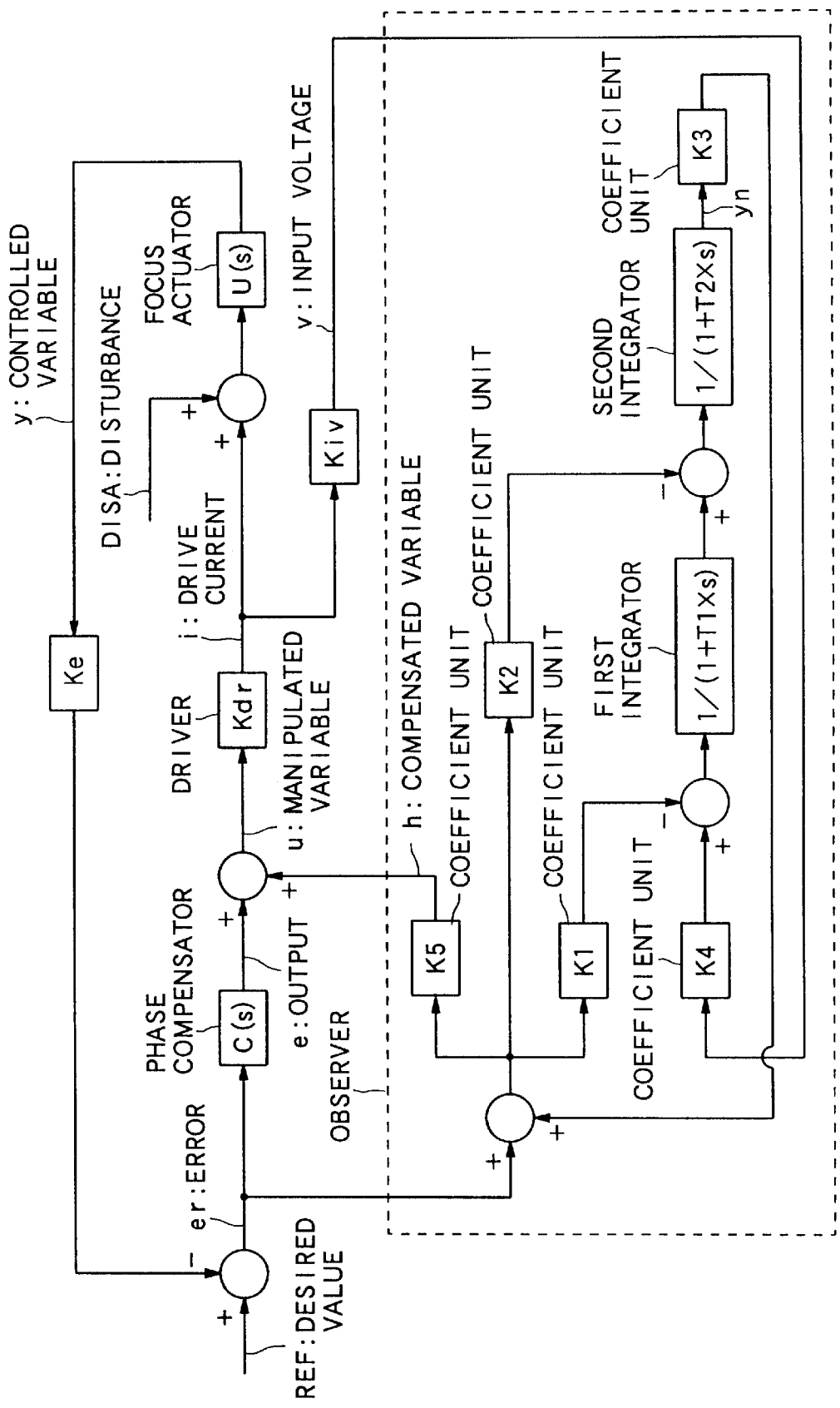
FIG. 6 is a block diagram showing a configuration of a control system of a second embodiment.
Figure 7A:
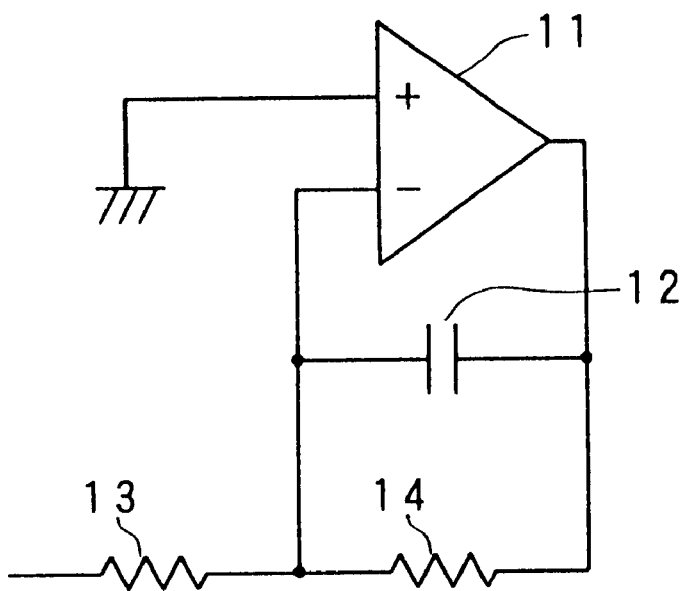
FIG. 7A is a block diagram showing a configuration of analog calculation by an integrator of the second embodiment.
Figure 7B:
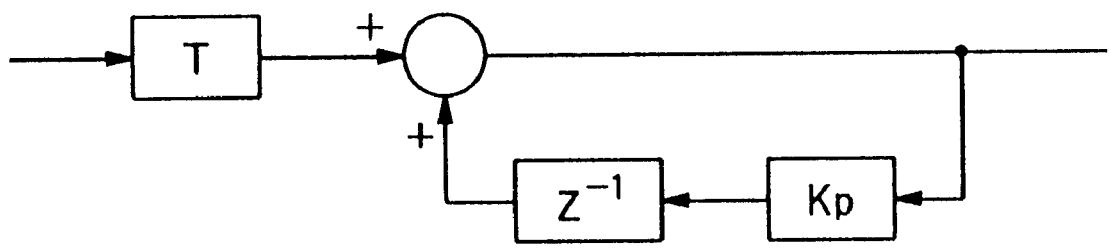
FIG. 7B is a block diagram showing a configuration of digital calculation by an integrator of the second embodiment.
Figure 8A:
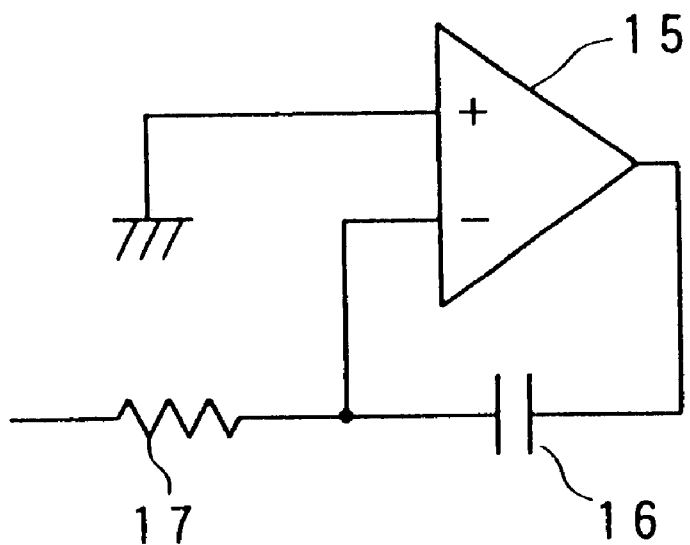
FIG. 8A is a block diagram showing a configuration of analog calculation by an complete integration type integrator.
Figure 8B:
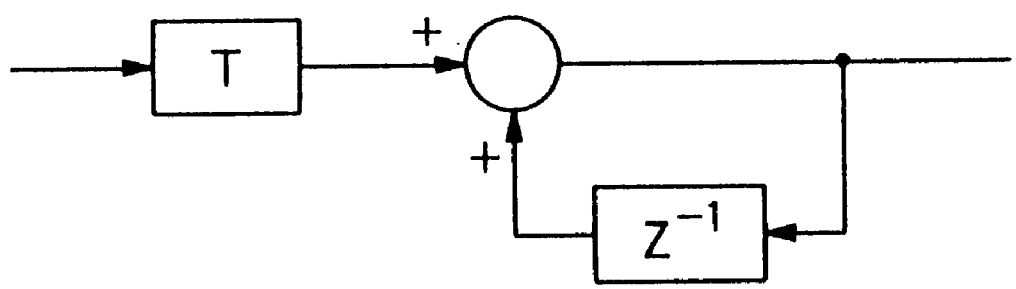
FIG. 8B is a block diagram showing a configuration of digital calculation by an complete integration type integrator.

FIG. 6 shows the internal configuration of the observer of the second embodiment, and the configuration of the entirety of the feedback control in the control system including the pickup controller PC and the actuator 1a. FIGS. 7A and 7B show the specific configurations of the integrator according to this embodiment. FIG. 7A shows the configuration of the analog calculation, and FIG. 7B shows the configuration by the digital calculation. FIGS. 8A and 8B show the specific configurations of the complete integration type integrators. FIG. 8A shows the configuration by the analog calculation, and FIG. 8B shows the configuration by the digital calculation. Furthermore, in FIG. 6, the control elements same as those in the feedback control system according to the first embodiment shown in FIG. 5 are applied with the same numerals and further detailed explanation is not given here.

Although the case with the transmission functions representing the two integrators in the observer 5b are 1/s has been explained in the above-mentioned first embodiment, in the second embodiment, at least one of the two integrators included in the observer comprises an incomplete integration type integrator.

The block diagram shown in FIG. 6 is the same as the block diagram shown in FIG. 5 except that the specific configurations of the integrators are shown, and the configuration and the operation as the second embodiment are the same as those of the observer 5b according to the first embodiment, only the configuration and the operation as the integrator will be described in the following explanation.

The integrators in the observer according to the second embodiment are the incomplete integration type. More specifically, in the case of the analog calculation, as shown in FIG. 7A, each comprises an operational amplifier 11, capacitor 12, and two resistors 13 and 14. On the other hand, in case of the digital calculation, they are as shown in FIG. 7B. In the case of the transmission function K(z) (in the case of the analog calculation) or K(s) (in the case of the digital calculation), $$K(z)=T/(1-Kp \times z^{-1}),$$

$$K(s)=1/1(1+T1(\text{or } T2) \times s)$$

are provided. Herein, T is the sampling cycle, Kp is the coefficient of the multiplier in the integrators, and $z^{-1}$ is:

$$z^{-1}=\exp(-T \times s).$$

This represents the calculation of delaying by one sample timing in the above-mentioned sampling cycle.

Advantages of using the integrators of the incomplete integration type as the integrators in the observer as in the second embodiment will be explained.

In general, when introducing the feedback servo loop shown in FIG. 6 from the open state to the closed state, the error er and the manipulated variable u become signals with a larger level compared with the ordinary state, so that the signals with the larger level are input to the observer. At the time, if an integrator of the complete integration type is used as an integrator in the observer, the operational amplifier in the integrator of the complete integration type is saturated in the low frequency region.

As the integrator of the complete integration type, specifically, in the case of the analog calculation, each comprises an operational amplifier 15, capacitor 16, and a resistor 17 as shown in FIG. 8A. In contrast, in the case the integrators are of the digital calculation, they are as shown in FIG. 8B. In the case of the transmission function K'(z) (in the case of the analog calculation) or K'(s) (in the case of the digital calculation), $$K'(z)=T/(1-z^{1}),$$

$$K'(s)=1(T1(\text{or } T2) \times s).$$

Recently, particularly in the products driven by a battery, a single power source and a low voltage are required in a power source. Therefore, it is becoming difficult to ensure the dynamic range in an output signal of a operational amplifier. Also from the viewpoint, avoidance of the saturation in the operational amplifier has been an important task.

As mentioned in the second embodiment, by limiting the gain in the low frequency region by the use of the incomplete integration type integrators in the observer, the saturation of the operational amplifier can be avoided.

On the other hand, a problem is involved in that in general, the accuracy of the compensated variable h is lowered if the operational amplifier is saturated, so that the disturbance suppression performance is deteriorated. Moreover, in the case the compensated variable h is remarkably inaccurate, the focus servo control itself may be stopped.

In order to prevent generation of the problems, a method of adding the compensated variable h from the observer after stabilization of the focus servo is conceivable. However, it is preferable to stabilize the servo control system by suppressing the disturbance quickly at the time of introducing the focus servo, and thus it is preferable to execute the disturbance suppressing performance by the observer at the time. By avoiding the saturation of the operational amplifier with the incomplete integration type integrator as the integrator in the observer, the above-mentioned contradicted problems can be solved at the same time.

As heretofore explained, according to the observer of the second embodiment, in addition to the effects of the observer 5b according to the first embodiment, since an incomplete integration type integrator is used as at least one of the two integrators comprising the internal model in the observer, the transitional characteristics of the feedback control system can be improved.

(IV) Third Embodiment

Figure 10:
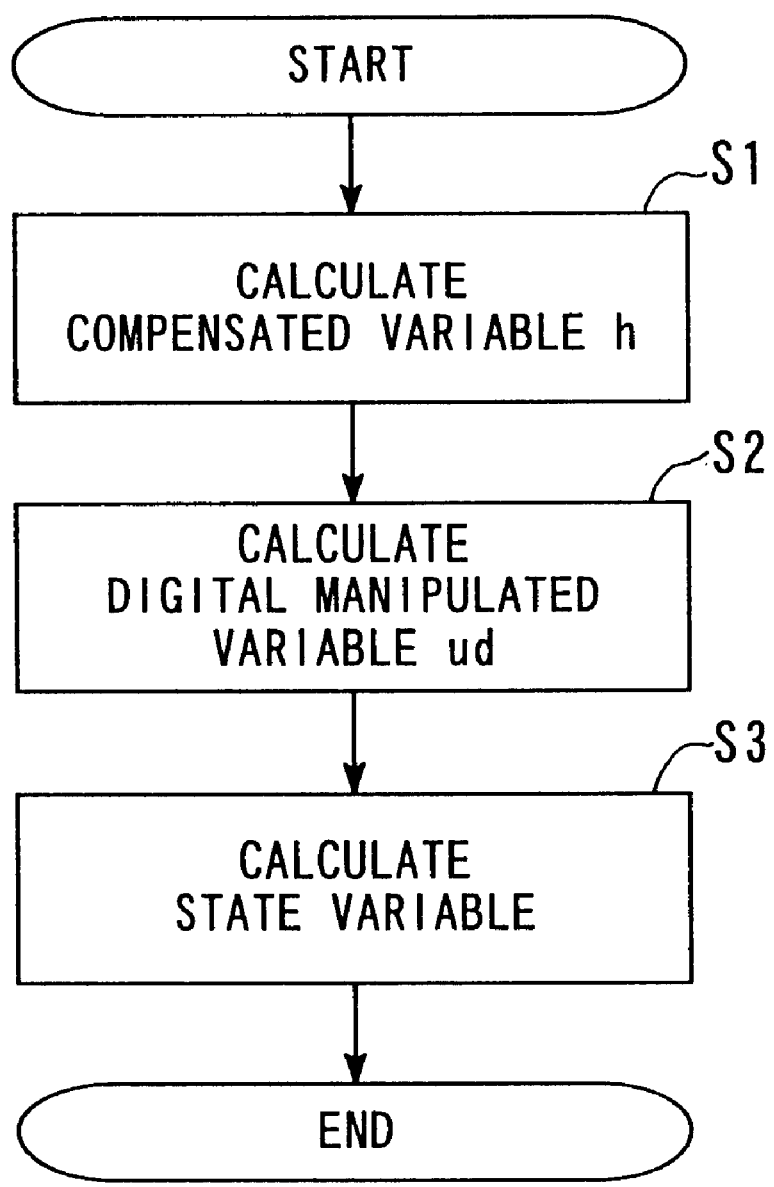
FIG. 10 is a flow chart showing a process of an observer according to the third embodiment.
Figure 11:
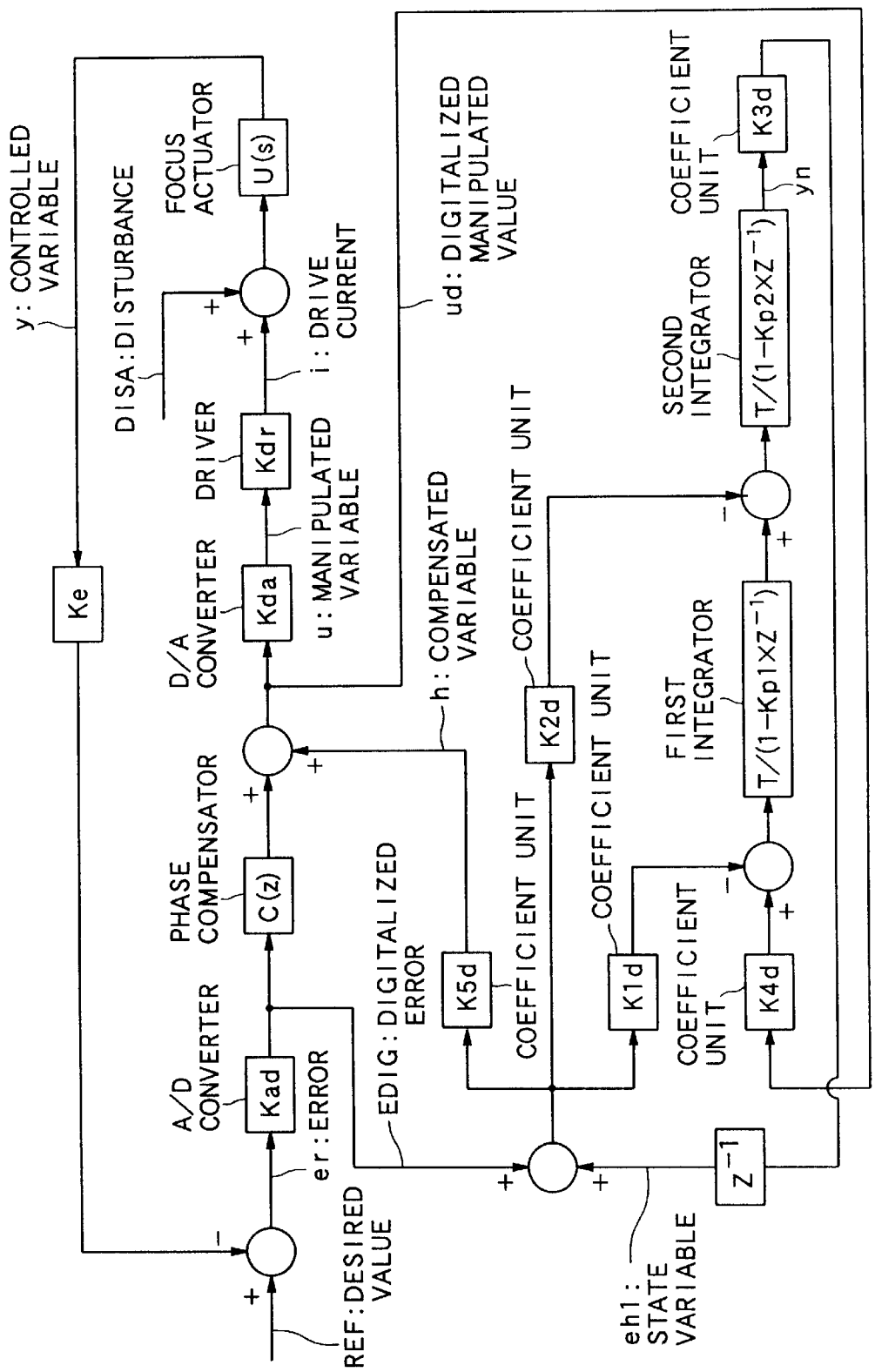
FIG. 11 is a block diagram showing a configuration of a control system according to the third embodiment.

The third embodiment of the present invention will be explained with reference to FIGS. 9 to 11.

Although the case of analog operation of the analog calculating circuit group including the observer has been explained in the above-mentioned first and second embodiments, in the third embodiment, the DSP (Digital Signal Processor) for digital process is used in place of the analog calculating circuit group.

The configuration of the pickup controller according to the third embodiment will be explained with reference to FIG. 9. FIG. 9 is a block diagram showing the configuration of the pickup controller according to the third embodiment.

Figure 9:
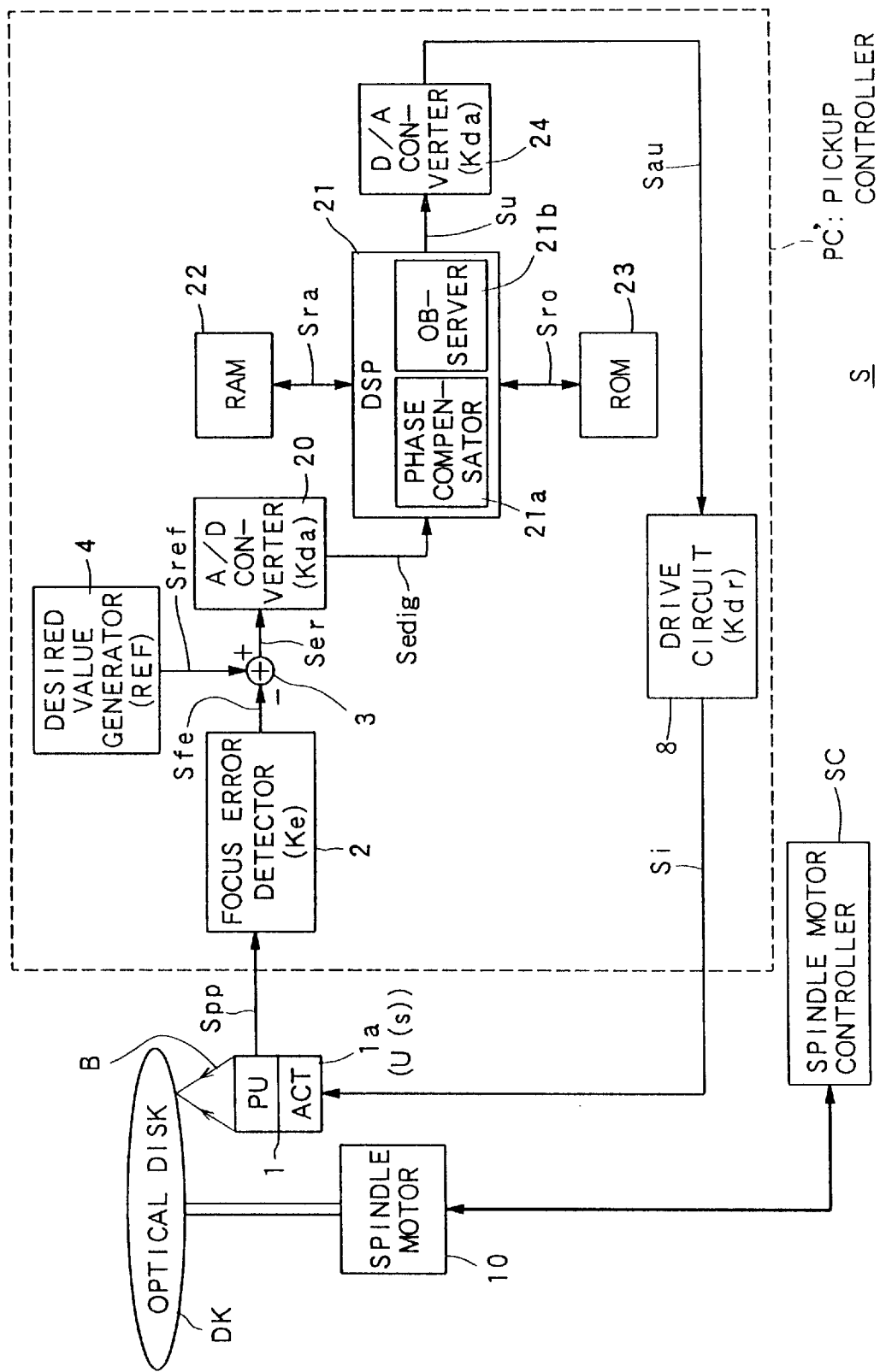
FIG. 9 is a block diagram showing a schematic configuration of an information reproducing apparatus according to a third embodiment.

As shown in FIG. 9, the pickup controller PC' in the information reproducing apparatus according to the third embodiment includes an A/D converter 20, a DSP 21, a RAM 22, a ROM 23, and a D/A converter 24 in addition to the focus error detector 2, the substractor 3, the desired value generator 4, and the drive circuit 8 in the pickup controller PC according to the above-mentioned first or second embodiment.

A phase compensator 21a and an observer 21b included in the DSP 21 are realized as the function of the DSP 21 according to the operation of the DSP 21 based on the control program stored in the ROM 23. The observer 21b and the phase compensator 21a can be realized as independent digital circuits.

Next, the outline of the operation will be explained.

The pickup 1 radiates the light beam B to the information recording surface of the optical disk DK while executing the tracking servo control and the focus servo control, generates a detection signal Spp based on the reflected light of the light beam B, and outputs the same to the focus error detector 2. The actuator 1 a corresponds to the controlled system (controlled system of the spring-mass system) U(s) in FIG. 11.

The focus error detector 2 generates a focus error signal Sfe based on the detection signal Spp, and outputs the same to one of the terminal of the subtractor 3.

At the same time, the desired value generator 4 generates and outputs a desired value signal Sref.

The subtractor 3 generates an error signal Ser showing the positional error concerning the focal position of the light beam B obtained by subtracting the value of the focus error signal Sfe from the value of the desired value signal Sref (corresponding to the error er in FIG. 11), and outputs the same to the A/D converter 20.

The A/D converter 20 converts the error signal Ser from an analog signal to a digital signal, generates a digital error signal Sedig, and outputs the same to the DSP 21. The digital error signal Sedig corresponds to the digital control error EDIG in FIG. 11. The conversion sensitivity of the A/D converter (that is, the digital value corresponding to the unit error in the positional error) corresponds to the conversion sensitivity Kad (digit/m) in FIG. 11.

According to the digital operation of the phase compensator 21a and the observer 21b, the DSP 21 generates a manipulation signal Su for driving the drive circuit 8, and outputs the same to the D/A converter 24. At the time, the DSP 21 executes the function as the above-mentioned phase compensator 21a and observer 21b based on the control program while reading out the control program preliminarily stored in the ROM 23 as a ROM signal Sro. Furthermore, the data necessary for executing the function are used while temporarily stored in the RAM 22 as a RAM signal Sra.

The D/A converter 24 converts the manipulation signal Su from a digital signal to an analog signal, generates an analog manipulation signal Sau, and outputs the same to the drive circuit 8. The conversion sensitivity in the D/A converter 24 (that is, the voltage value corresponding to one digital value) corresponds to the conversion sensitivity Kda (volt/digit) in FIG. 11.

The drive circuit 8 amplifies the analog manipulation signal Sau, which is a voltage signal as well as generates a drive signal Si (drive current i in FIG. 11) having the current value corresponding to the voltage value of the amplified analog manipulation signal Sau, and outputs the same to the actuator la so as to move the objective lens for the drive.

The feedback control according to the present invention in a control system including the pickup controller PC' and the actuator 1a having the above-mentioned configuration will be explained with reference to FIGS. 10 and 11. FIG. 10 is a flow chart showing the disturbance estimating process in the observer 21b, and FIG. 11 is a block diagram showing the internal configuration of the observer, and the configuration of the entirety of the feedback control in the control system including the pickup controller PC' and the actuator 1a. In FIG. 11, the control elements same as those in the feedback control system according to the first embodiment shown in FIG. 5 are applied with the same numerals and further detailed explanation is not given here.

Since the controlled system U(s) in the third embodiment is the actuator 1a, the controlled variable y is a position of the objective lens in the direction perpendicular to the information recording surface of the optical disk DK.

Similar to the case of the first or second embodiment, the transmission function of the actuator 1a can be approximated as the second order delay system as:

$$U(s) = A \times wa^2/(s^2 + 2 \times k \times wa \times s + wa^2).$$

With the gain constant of the actuator 1a as Kg, the first order coefficient of the actuator 1a as K1, and the second order coefficient of the actuator 1a as K2, the transmission function of the actuator 1a can be converted to the digital system as:

$$Un(z) = Kg/(1 + K1 \times z^{-1} + K2 \times z^{-2}).$$

On the other hand, with the positional detection sensitivity as the error signal detection sensitivity in the focus error detector 2 as Ke, and further, the conversion sensitivity in the A/D converter 20 as Kad (digit/volt), $$REF - y \times Ke = er,$$

and $$Kad \times er = EDIG$$

are provided. According to this formula, the controlled variable y is output from the A/D converter 20 as a digital error signal Sedig (digital control error EDIG).

Next, the configuration and the operation of the observer 21b will be explained with reference to FIGS. 10 and 11.

In the observer 21b, the compensated variable h in the current sample timing is calculated using the digital control error EDIG and the state variable eh1 before by one sample timing as follows (step S1);

$$buf = EDIG + eh1,$$

and $$h = k5d \times buf.$$

Herein, k5d is a digitalized coefficient of the coefficient k5 in the first or second embodiment, and buf is a value of the register (not illustrated) to be used for the calculation in the step S1.

At the time, the above-mentioned acceleration disturbance DISA is included in the compensated variable h.

The digital manipulated variable ud at the current sample timing is calculated using the above-mentioned calculated compensated variable h at the current timing and the digital control error EDIG by the below-mentioned formula so as to output the same as a manipulation signal Su to the D/A converter 24 (step S2):

$$ud = EDIG \times C(z) + h.$$

Herein, C(z) is the transmission function of the phase compensator 21a. Concrete examples of C(z) is, for example:

$$C(z) = Kp + Ki/(1 - z^{-1}) + Kd \times (1 - z^{-1}).$$

Herein, Kp is a proportional term, Ki is an integration term, and Kd is a differentiation term. The calculation shown by "$\times z^{-1}$" is a calculation for obtaining the amount before by one sample timing (that is, the calculation shown by exp $(-s \times T)$ (T is a sampling cycle)).

And finally, the above-mentioned state variable in the observer at the current sample timing is calculated using the register value buf obtained in the step S1 and the digital manipulation variable ud of the current sample timing, and store the same as eh1 so as to be used for the calculation in the next sample timing (step S3):

$$eh1=[\{(ud \times k4d - buf \times k1d) \times T/(1-Kp1 \times z^{-1})\} - buf \times k2d] \times k3d \times T/(1-kp2 \times z^{-1}).$$

Herein, k1d, k2d, k4d and k3d are digitalized coefficients each of the coefficients k1, k2, k4 and k3 in the first or second embodiment. With the conversion sensitivity in the D/A converter 24 as Kda (Volt/digit), $$k1d=wr^2/(A \times wa^2 \times Ke \times Kad),$$

$$k2d=2 \times kr \times wr/(A \times wa^2 \times Ke \times Kad),$$

$$k5d=1/(Kdr \times Kda \times A \times wa^2 \times Ke \times Kad),$$

$$k4d=Kda \times Kdr,$$

and $$k3d=A \times wa^2 \times Ke \times Kad$$

are provided. Furthermore, each of Kp1 and Kp2 is a coefficient for designating a pole in the incomplete integration (0<Kp1, and Kp2<1).

By converting the digital manipulated variable ud to the analog value by the D/A converter 24 for generating an analog manipulation signal Sau, drives the drive circuit 8 thereby for generating a drive signal Si, and outputs the same to the actuator 1a for the drive.

The reason why the compensated variable h at the current sample timing was calculated using the state variable eh1 before by one sample timing in the above-mentioned step S1 will be explained.

To obtain the ideal compensated variable, the compensated variable h at the current sample timing should be calculated using the state variable at the current sample timing, however, the state variable at the current sample timing is a value obtainable after finishing the calculation to the above-mentioned step S3. Therefore, since it is unknown number at the stage of the above-mentioned step S1, it cannot be used for the calculation of the compensated variable h. Therefore, the state variable eh1 before by one sample timing is used instead of the state variable at the current sample timing. The value of the state variables do not change drastically by one sample timing. That is, in the case the sampling frequency is sufficiently high compared with the servo band of the feedback control system, delay by one sample timing is not significant.

Although the configuration wherein the desired value REF is applied as an analog signal has been explained in the above-mentioned third embodiment, the desired value REF may be applied as a digital value after the preliminary A/D conversion as follows:

$$y \times Ke=er,$$

and $$REF-Kad \times er=EDIG.$$

Moreover, although the configuration wherein the manipulation signal Su is converted to the analog manipulation signal Sau by the D/A converter 24 has been explained in the above-mentioned third embodiment, the analog manipulation signal Sau can be generated from the manipulation signal Su by a PWM (Pulse Width Modulation) circuit, or the like.

Furthermore, although the case wherein the present invention is adopted to the focus servo control with respect to the objective lens in the pickup 1 has been explained in the above-mentioned third embodiment, the present invention can be adopted to the tracking servo control with respect to the objective lens similar to the case of the third embodiment.

Moreover, the phase compensator can be provided as an analog circuit as in the first embodiment, or in contrast, the observer can be provided as a digital circuit as in the third embodiment. Accordingly, the present invention can be modified in various forms not only in the analog circuit or the digital circuit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. Hei 11-39050 filed on Feb. 17, 1999 including the specification, claims, drawings and summary is incorporated herein by reference in its entirety.

What is claimed is:

1. A servo control apparatus for performing a feedback control to a controlled system having characteristics represented by a characteristic equation including at least a second order term, a first order term and a zero order term, comprising:

a disturbance estimating device that has an internal model having characteristics represented by a characteristic equation including only a second order term, and that estimates a disturbance applied to the controlled system by using the internal model, thereby generating an estimated disturbance value; and a compensating device that compensates the disturbance on the basis of the estimated disturbance value, wherein the controlled system is of a spring-mass system, and the internal model is of an inertial system.

2. The servo control apparatus according to claim 1, wherein the compensating device compensates the disturbance in a frequency band higher than a natural frequency of the controlled system.

3. The servo control apparatus according to claim 1, wherein the internal model includes at least two integration elements, and at least one of the integration elements is of an incomplete integration type.

4. The servo control apparatus according to claim 1, wherein the disturbance estimating device includes a robust filtering device having second or more order low-pass filtering characteristics.

5. The servo control apparatus according to claim 1, wherein the disturbance estimating device comprises a digital processing unit, and the digital processing unit estimates the disturbance by using a digital manipulated variable at a current sample timing, a digital error at the current sample timing and a digital state variable at a previous sample timing.

6. The servo control apparatus according to claim 1, wherein the controlled system is a tracking servo control device for a tracking servo control in an information recording or reproducing apparatus for an optical recording medium.

7. The servo control apparatus according to claim 1, wherein the controlled system is a focus servo control device for a focus servo control in an information recording or reproducing apparatus for an optical recording medium.

8. A servo control method for a feedback control to a controlled system having characteristics represented by a characteristic equation including at least a second order term, a first order term and a zero order term, comprising the processes of:

estimating a disturbance applied to the controlled system by using an internal model having characteristics represented by a characteristic equation including only a second order term, thereby generating an estimated disturbance value; and compensating the disturbance on the basis of the estimated disturbance value, wherein the controlled system is of a spring-mass system, and the internal model is of an inertial system.

9. The servo control method according to claim 8, wherein the process of compensating the disturbance comprises the process of compensating the disturbance in a frequency band higher than a natural frequency of the controlled system.

10. The servo control method according to claim 8, wherein the internal model includes at least two integration elements, and at least one of the integration elements is of an incomplete integration type.

11. A servo control apparatus for performing feedback control of a spring-mass control system, comprising:

a disturbance estimating device for estimating a disturbance in position applied to said control system, said estimating device having an internal model represented by a characteristic equation including only a second order term, and wherein output of said control system is a second order delay system;

a compensating device for compensating the disturbance based on the estimated disturbance; and said control system represented by a characteristic equation including at least a second order term, a first order term and a zero order term.

12. The servo control apparatus as in claim 11, wherein the compensating device compensates the disturbance in a frequency band higher than a natural frequency of the control system.

13. The servo control apparatus as in claim 11, wherein the internal model includes at least two integration elements, and at least one of the integration elements is of an incomplete integration type.

14. The servo control apparatus as in claim 11, wherein the disturbance estimating device includes a robust filtering device having second or more order low-pass filtering characteristics.

15. The servo control apparatus as in claim 11, wherein the disturbance estimating device comprises a digital processing unit, and the digital processing unit estimates the disturbance by using a digital manipulated variable at a current sample timing, a digital error at the current sample timing and a digital state variable at a previous sample timing.

16. The servo control apparatus as in claim 11, wherein the control system is a tracking servo control device for a tracking servo control in an information recording or reproducing apparatus for an optical recording medium.

17. The servo control apparatus as in claim 11, wherein the control system is a focus servo control device for a focus servo control in an information recording or reproducing apparatus for an optical recording medium.

18. A servo control method for performing feedback control of a spring-mass control system, said method comprising:

estimating a disturbance in position, applied to said control system, by using an estimating device having internal model represented by a characteristic equation including only a second order term, and wherein output of said control system is a second order delay system, and wherein said control system is represented by a characteristic equation including at least a second order term, a first order term and a zero order term, and wherein transfer function of said control system is different from transfer function of said estimating device;

generating an estimated disturbance value; and compensating the disturbance based on the estimated disturbance value.

19. A servo control apparatus, comprising:

a position control system;

a disturbance estimating device for estimating a disturbance applied to said control system, said estimating device having an internal model represented by a characteristic equation including only a second order term, and wherein output of said control system is a second order delay system, wherein transfer function of said control system is different from transfer function of said estimating device;

a compensating device for compensating the disturbance based on the estimated disturbance; and said control system represented by a characteristic equation including at least a second order term, a first order term and a zero order term.

20. A servo control method for performing feedback control of a position control system, said method comprising:

estimating a disturbance in position by using an internal model represented by a characteristic equation including only a second order term, and wherein output of said control system is a second order delay system, and wherein said control system is represented by a characteristic equation including at least a second order term, a first order term and a zero order term, wherein transfer function of said control system is different from transfer function of said estimating device;

generating an estimated position disturbance value; and compensating the disturbance based on the estimated position disturbance value.

21. A servo control apparatus for performing a feedback control to a controlled system having characteristics represented by a characteristic equation including at least a second order term, a first order term and a zero order term, comprising:

a disturbance estimating device that has an internal model having characteristics represented by a characteristic equation including only a second order term, and that estimates a positional disturbance applied to the controlled system by using the internal model, thereby generating an estimated disturbance value; and a compensating device, executing a proportional-integral-derivative action, that compensates the disturbance on the basis of the estimated disturbance value, wherein the controlled system is of a spring-mass system, and the internal model is of an inertial system.

22. A servo control method for a feedback control to a controlled system having characteristics represented by a characteristic equation including at least a second order term, a first order term and a zero order term, comprising:

estimating a positional disturbance applied to the controlled system by using an internal model having characteristics represented by a characteristic equation including only a second order term, thereby generating an estimated disturbance value; and compensating the disturbance, by executing a proportional-integral-derivative action, on the basis of the estimated disturbance value, wherein the controlled system is of a spring-mass system, and the internal model is an inertial system.

* * * * *